US008805059B2

(12) United States Patent
Dedeoglu et al.

(10) Patent No.: US 8,805,059 B2
(45) Date of Patent: Aug. 12, 2014

(54) METHOD, SYSTEM AND COMPUTER PROGRAM PRODUCT FOR SEGMENTING AN IMAGE

(71) Applicant: Texas Instruments Incorporated, Dallas, TX (US)

(72) Inventors: Goksel Dedeoglu, Plano, TX (US); Huimin Guo, College Park, MD (US)

(73) Assignee: Texas Instruments Incorporated, Dallas, TX (US)

( * ) Notice: Subject to any disclaimer, the term of this patent is extended or adjusted under 35 U.S.C. 154(b) by 4 days.

(21) Appl. No.: 13/659,329

(22) Filed: Oct. 24, 2012

(65) Prior Publication Data

US 2013/0101206 A1 Apr. 25, 2013

Related U.S. Application Data

(60) Provisional application No. 61/550,728, filed on Oct. 24, 2011.

(51) Int. Cl.
*G06T 15/00* (2011.01)
*G06T 7/00* (2006.01)
*G06T 7/20* (2006.01)

(52) U.S. Cl.
CPC ............ *G06T 7/0081* (2013.01); *G06T 7/2053* (2013.01); *G06T 2207/10021* (2013.01); *G06T 2207/30232* (2013.01); *G06T 2207/20224* (2013.01)
USPC .......................................... 382/154; 382/173

(58) Field of Classification Search
None
See application file for complete search history.

(56) References Cited

U.S. PATENT DOCUMENTS 8,594,425 B2 * 11/2013 Gurman et al. ............... 382/173
2013/0129194 A1 * 5/2013 Gusis et al. ................... 382/154

OTHER PUBLICATIONS

Harville et al., "Foreground Segmentation Using Adaptive Mixture Models in Color and Depth", IEEE Workshop: Detection and Recognition of Events in Video, 2001, pp. 3-11, IEEE, Vancouver, BC, CA.
Eveland et al., "Background Modeling for Segmentation of Video-Rate Stereo Sequences", IEEE: Computer Society Conference: Computer Vision and Pattern Recognition, Jun. 23-25, 1998, pp. 266-271, IEEE, Santa Barbara, California, US.

* cited by examiner

*Primary Examiner* — Brian P Werner
(74) *Attorney, Agent, or Firm* — Michael A. Davis, Jr.; Frederick J. Telecky, Jr.

(57) ABSTRACT

A first depth map is generated in response to a first stereoscopic image from a camera. The first depth map includes first pixels having valid depths and second pixels having invalid depths. A second depth map is generated in response to a second stereoscopic image from the camera. The second depth map includes third pixels having valid depths and fourth pixels having invalid depths. A first segmentation mask is generated in response to the first pixels and the third pixels. A second segmentation mask is generated in response to the second pixels and the fourth pixels. In response to the first and second segmentation masks, a determination is made of whether the second stereoscopic image includes a change in comparison to the first stereoscopic image.

30 Claims, 8 Drawing Sheets

METHOD, SYSTEM AND COMPUTER PROGRAM PRODUCT FOR SEGMENTING AN IMAGE

CROSS-REFERENCE TO RELATED APPLICATION

This application claims priority to U.S. Provisional Patent Application Ser. No. 61/550,728, filed Oct. 24, 2011, entitled EXPLOITING DEPTH ESTIMATION ERRORS FOR FOREGROUND-BACKGROUND SEGMENTATION, naming Goksel Dedeoglu et al. as inventors, which is hereby fully incorporated herein by reference for all purposes.

BACKGROUND

The disclosures herein relate in general to image processing, and in particular to a method, system and computer program product for segmenting an image.

For segmenting an image (e.g., stereoscopic image) to detect a foreground object, some previous techniques have attempted to improve robustness (e.g., against illumination changes, shadows and inter-reflections) by using depths of pixels within the image, but such techniques have shortcomings where those pixels have invalid depths (e.g., depth errors). Moreover, such techniques have shortcomings if the object's distance (e.g., away from a camera) increases, because triangulation accuracy (and, likewise, a resolution of the object's depth) may degrade as a quadratic function of such distance.

SUMMARY

A first depth map is generated in response to a first stereoscopic image from a camera. The first depth map includes first pixels having valid depths and second pixels having invalid depths. A second depth map is generated in response to a second stereoscopic image from the camera. The second depth map includes third pixels having valid depths and fourth pixels having invalid depths. A first segmentation mask is generated in response to the first pixels and the third pixels. A second segmentation mask is generated in response to the second pixels and the fourth pixels. In response to the first and second segmentation masks, a determination is made of whether the second stereoscopic image includes a change in comparison to the first stereoscopic image.

DETAILED DESCRIPTION

Figure 1:
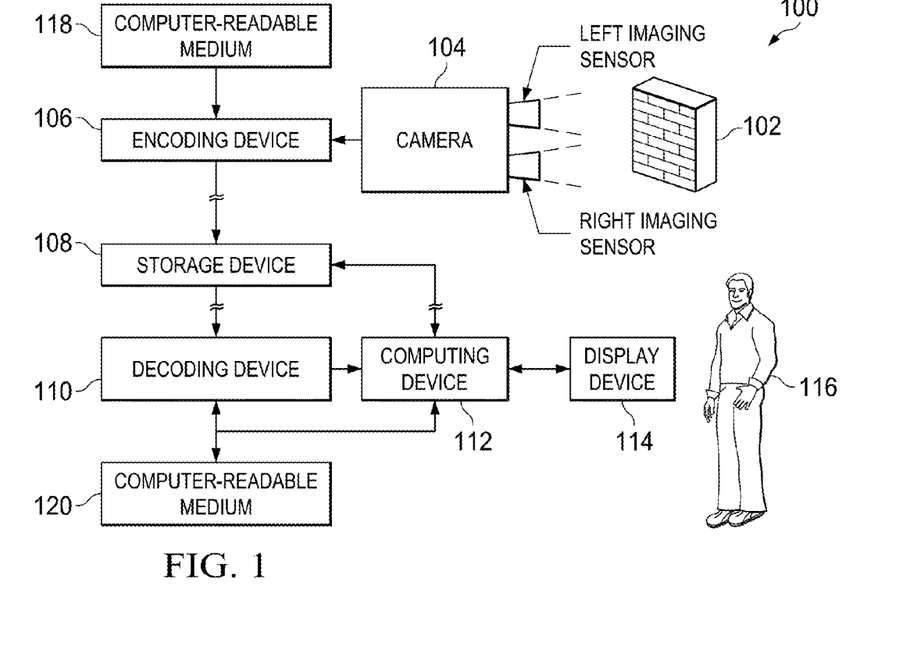
FIG. 1 is a block diagram of an information handling system of the illustrative embodiments.

FIG. 1 is a block diagram of an information handling system (e.g., one or more portable battery-powered electronics devices, such as mobile smartphones), indicated generally at 100, of the illustrative embodiments. In the example of FIG. 1, a scene (e.g., including a physical object 102 and its surrounding foreground and background) is viewed by a stereoscopic camera 104, which: (a) captures and digitizes images of such views; and (b) outputs a video sequence of such digitized (or "digital") images to an encoding device 106. As shown in FIG. 1, the camera 104 includes dual imaging sensors, which are spaced apart from one another, namely: (a) a first imaging sensor for capturing, digitizing and outputting (to the encoding device 106) a first image of a view for a human's left eye; and (b) a second imaging sensor for capturing, digitizing and outputting (to the encoding device 106) a second image of a view for the human's right eye.

The encoding device 106: (a) receives the video sequence from the camera 104; (b) encodes the video sequence into a binary logic bit stream; and (c) outputs the bit stream to a storage device 108, which receives and stores the bit stream. A decoding device 110: (a) reads the bit stream from the storage device 108; (b) in response thereto, decodes the bit stream into the video sequence; and (c) outputs the video sequence to a computing device 112.

The computing device 112: (a) receives the video sequence from the decoding device 110 (e.g., in response to a command from a display device 114, such as a command that a user 116 specifies via a touchscreen of the display device 114); and (b) outputs the video sequence to the display device 114 for display to the user 116. Substantially concurrent with such receiving (from the decoding device 110) and such outputting (to the display device 114) in real-time, the computing device 112 automatically: (a) in response to the video sequence, segments the scene's foreground and background to detect changes in the scene (e.g., appearance or disappearance therein of objects between successive images of the scene), as discussed hereinbelow in connection with FIGS. 3-10; (b) in response to such detection, modifies the video sequence to highlight respective locations of such objects, so that such highlighting is displayed to the user 116 by the display device 114; and (c) writes the modified video sequence for storage into the storage device 108.

The display device 114: (a) receives the video sequence from the computing device 112 (e.g., in response to a command that the user 116 specifies via the touchscreen of the display device 114); and (b) in response thereto, displays the video sequence (e.g., stereoscopic images of the object 102 and its surrounding foreground and background), which is viewable by the user 116 with 3D effect. The display device 114 is any suitable display device that includes a stereoscopic display screen whose optical components enable viewing by the user 116 with 3D effect, such as a suitable plasma display screen, liquid crystal display ("LCD") screen, or light emitting diode ("LED") display screen. In one example, the display device 114 displays a stereoscopic image with 3D effect for viewing by the user 116 through special glasses that: (a) filter the first image against being seen by the right eye of the user 116; and (b) filter the second image against being seen by the left eye of the user 116. In another example, the display device 114 displays the stereoscopic image with 3D effect for viewing by the user 116 without relying on special glasses.

The encoding device 106 performs its operations in response to instructions of computer-readable programs, which are stored on a computer-readable medium 118 (e.g., hard disk drive, nonvolatile flash memory card, and/or other storage device). Also, the computer-readable medium 118 stores a database of information for operations of the encoding device 106. Similarly, the decoding device 110 and the computing device 112 perform their operations in response to instructions of computer-readable programs, which are stored on a computer-readable medium 120. Also, the computer-readable medium 120 stores a database of information for operations of the decoding device 110 and the computing device 112.

The system 100 includes various electronic circuitry components for performing the system 100 operations, implemented in a suitable combination of software, firmware and hardware, such as one or more digital signal processors ("DSPs"), microprocessors, discrete logic devices, application specific integrated circuits ("ASICs"), and field-programmable gate arrays ("FPGAs"). In one embodiment: (a) a first mobile smartphone includes the camera 104, the encoding device 106, and the computer-readable medium 118, which are housed integrally with one another; and (b) a second mobile smartphone includes the decoding device 110, the computing device 112, the display device 114 and the computer-readable medium 120, which are housed integrally with one another.

In an alternative embodiment: (a) the encoding device 106 outputs the bit stream directly to the decoding device 110 via a network, such as a mobile (e.g., cellular) telephone network, a landline telephone network, and/or a computer network (e.g., Ethernet, Internet or intranet); and (b) accordingly, the decoding device 110 receives and processes the bit stream directly from the encoding device 106 substantially in real-time. In such alternative embodiment, the storage device 108 either: (a) concurrently receives (in parallel with the decoding device 110) and stores the bit stream from the encoding device 106; or (b) is absent from the system 100.

Figure 2:
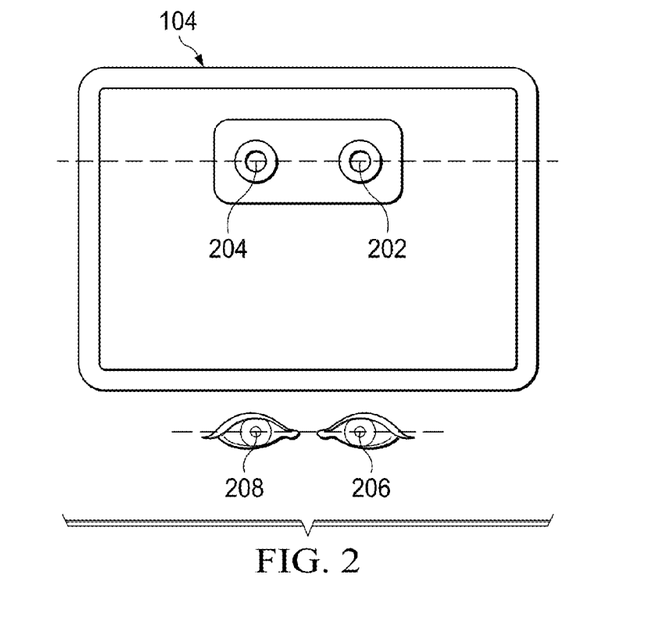
FIG. 2 is a diagram of an example orientation of dual imaging sensors of a camera of FIG. 1.

FIG. 2 is a diagram of an example orientation of the dual imaging sensors 202 and 204 (of the camera 104), in which a line between the sensors 202 and 204 is substantially parallel to a line between eyes 206 and 208 of the user 116. In this example, while the sensors 202 and 204 have such orientation, the camera 104 captures and digitizes images with a landscape aspect ratio.

Figure 3:
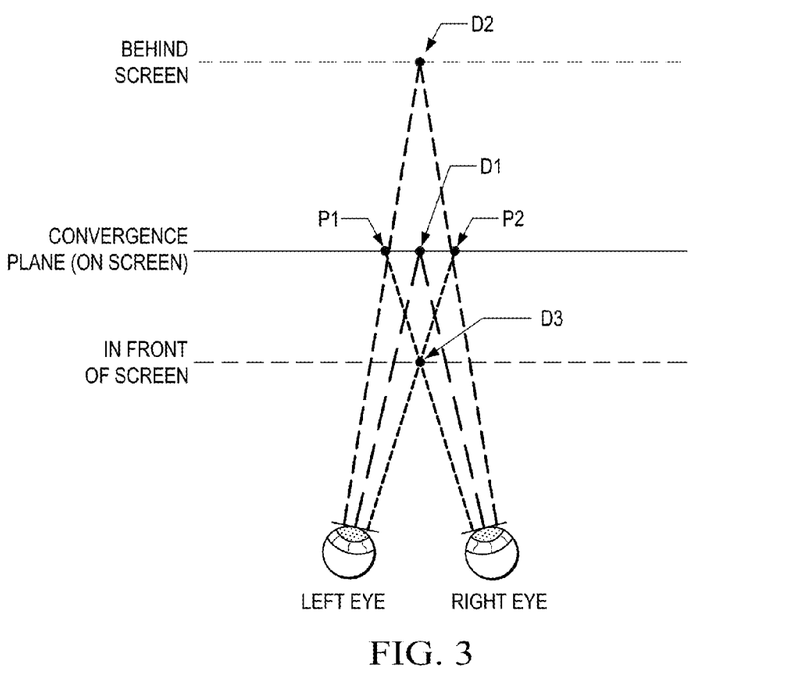
FIG. 3 is a diagram of viewing axes of a human's left and right eyes.

FIG. 3 is a diagram of viewing axes of the left and right eyes of the user 116. In the example of FIG. 3, a stereoscopic image is displayed by the display device 114 on a screen (which is a convergence plane where viewing axes of the left and right eyes naturally converge to intersect). The user 116 experiences the 3D effect by viewing the stereoscopic image on the display device 114, so that various features (e.g., objects) appear on the screen (e.g., at a point D1), behind the screen (e.g., at a point D2), and/or in front of the screen (e.g., at a point D3).

Within the stereoscopic image, a feature's disparity is a shift between: (a) such feature's location within the first image; and (b) such feature's corresponding location within the second image. A limit of such disparity is dependent on the camera 104. For example, if a feature (within the stereoscopic image) is centered on the point D1 within the first image, and likewise centered on the point D1 within the second image, then: (a) such feature's disparity=D1−D1=0; and (b) the user 116 will perceive the feature to appear at the point D1 with zero disparity on the screen, which is a natural convergence distance away from the left and right eyes.

By comparison, if the feature is centered on a point P1 within the first image, and centered on a point P2 within the second image, then: (a) such feature's disparity=P2−P1; and (b) the user 116 will perceive the feature to appear at the point D2 with positive disparity behind the screen, which is greater than the natural convergence distance away from the left and right eyes. Conversely, if the feature is centered on the point P2 within the first image, and centered on the point P1 within the second image, then: (a) such feature's disparity=P1−P2; and (b) the user 116 will perceive the feature to appear at the point D3 with negative disparity in front of the screen, which is less than the natural convergence distance away from the left and right eyes. The amount of the feature's disparity (e.g., horizontal shift of the feature from P1 within the first image to P2 within the second image) is measurable as a number of pixels, so that: (a) positive disparity is represented as a positive number; and (b) negative disparity is represented as a negative number.

Figure 4A:
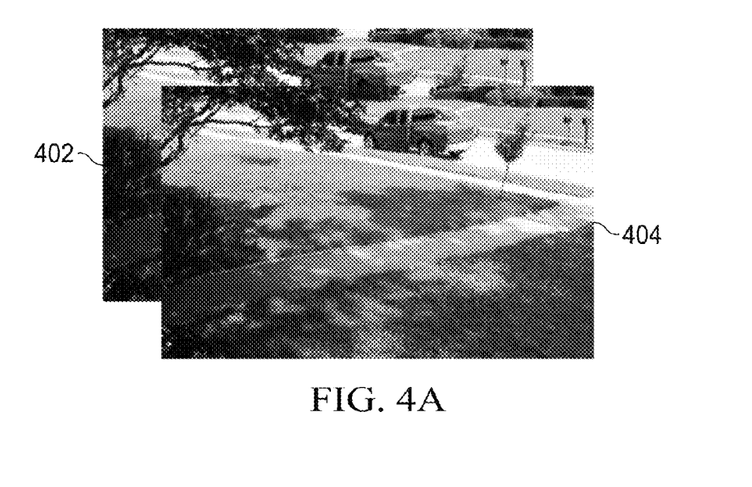
FIG. 4A is an example first stereoscopic image received from the camera of FIG. 1.

FIG. 4A is an example first pair of images received from the camera 104, including: (a) a first image 402, as captured by the sensor 202, for viewing by the left eye 206; and (b) a second image 404, as captured by the sensor 204, for viewing by the right eye 208. For example, in association with one another, the first and second images 402 and 404 are contemporaneously (e.g., simultaneously) captured, digitized and output (to the encoding device 106) by the sensors 202 and 204, respectively. Accordingly, the first image and its associated second image are a matched pair, which correspond to one another, and which together form a stereoscopic image for viewing by the user 116 with three-dimensional ("3D") effect on the display device 114. In the example of FIG. 4A, disparities (of various features between the first and second images) exist in a horizontal direction, which is parallel to the line between the sensors 202 and 204 in the orientation of FIG. 2.

The computing device 112 receives the matched pair of first and second images from the decoding device 110. Optionally, in response to the database of information (e.g., training information) from the computer-readable medium 120, the computing device 112: (a) identifies (e.g., detects and classifies) various low level features (e.g., colors, edges, textures, focus/blur, object sizes, gradients, and positions) and high level features (e.g., faces, bodies, sky, foliage, and other objects) within the stereoscopic image, such as by performing a mean shift clustering operation to segment the stereoscopic image into regions; and (b) computes disparities of such features (between the first image and its associated second image). The computing device 112 automatically generates a depth map that assigns respective depth values to pixels of the stereoscopic image (e.g., in response to such disparities).

Figure 4B:
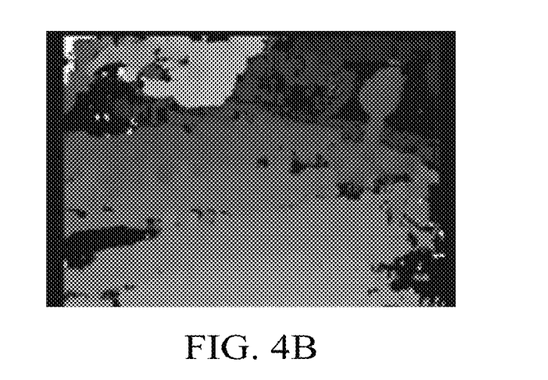
FIG. 4B is an example depth map for the stereoscopic image of FIG. 4A.

FIG. 4B is an example depth map, which is generated by the computing device 112 in response to the stereoscopic image of FIG. 4A, where: (a) the first image 402 is a reference image; and (b) the second image 404 is a non-reference image. In the example depth map of FIG. 4B: (a) brighter intensity pixels ("shallower pixels") indicate relatively nearer depths of their spatially collocated pixels within the reference image, according to various levels of such brighter intensity; (b) darker intensity pixels ("deeper pixels") indicate relatively farther depths of their spatially collocated pixels within the reference image, according to various levels of such darker intensity; and (c) completely black pixels ("indeterminate pixels") indicate that depths of their spatially collocated pixels within the reference image are indeterminate, due to at least one error in the depth map generation by the computing device 112 ("depth error").

Figure 4C:
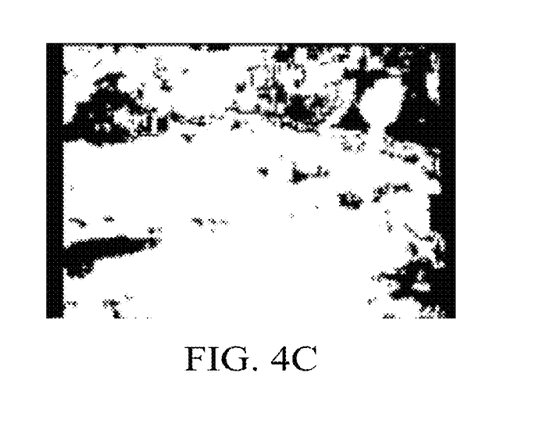
FIG. 4C is an example valid depth mask for the depth map of FIG. 4B.

FIG. 4C is an example valid depth mask, in which: (a) all of the indeterminate pixels are black, which indicates that their spatially collocated pixels have invalid depths (e.g., depth errors) within the depth map (FIG. 4B); and (b) all of the remaining pixels are white, which indicates that their spatially collocated pixels have valid depths within the depth map (FIG. 4B).

Figure 5A:
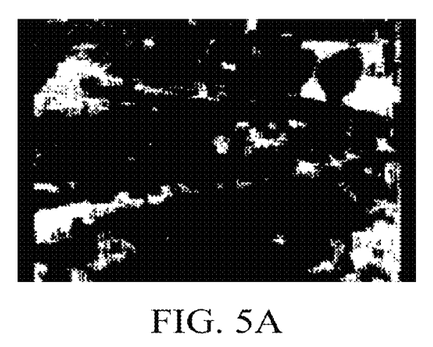
FIG. 5A is an example depth error mask of a first portion of indeterminate pixels of FIG. 4C.

FIG. 5A is an example depth error mask of a first portion of the indeterminate pixels of FIG. 4C. In the depth error mask of FIG. 5A, white pixels indicate the first portion. For those white pixels of the first portion, the depth errors are caused by an insufficient curvature within the stereoscopic image of FIG. 4A.

Figure 5B:
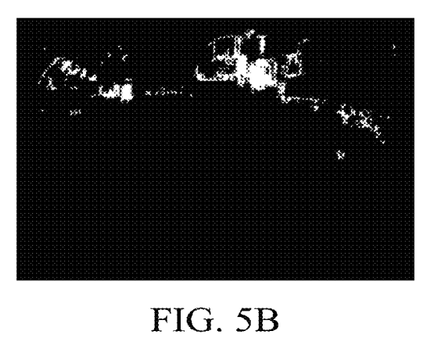
FIG. 5B is an example depth error mask of a second portion of the indeterminate pixels of FIG. 4C.

FIG. 5B is an example depth error mask of a second portion of the indeterminate pixels of FIG. 4C. In the depth error mask of FIG. 5B, white pixels indicate the second portion. For those white pixels of the second portion, the depth errors are caused by exceeding a search range boundary within the stereoscopic image of FIG. 4A.

Together, the white pixels of FIGS. 5A and 5B combine (e.g., by a logical OR operation, which has an effect of overlaying the depth error masks of FIGS. 5A and 5B in alignment with one another) to show all of the black pixels of FIG. 4C. Accordingly, the black pixels of FIG. 4C are a combination (e.g., logical OR) of the white pixels of FIGS. 5A and 5B.

Figure 6A:
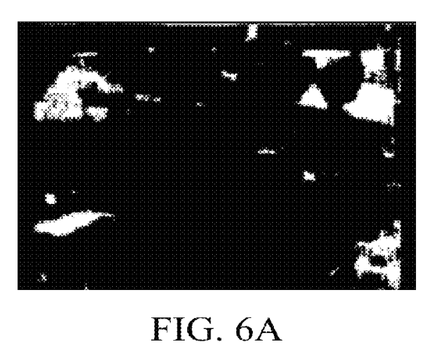
FIG. 6A is an example first depth error background model that a computing device of FIG. 1 generates by temporal infinite impulse response ("IIR") filtering, and thresholding, of the depth error mask of FIG. 5A.
Figure 6B:
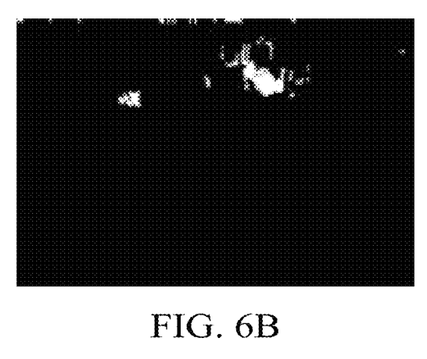
FIG. 6B is an example second depth error background model that the computing device of FIG. 1 generates by temporal IIR filtering, and thresholding, of the depth error mask of FIG. 5B.

FIG. 6A is an example first depth error background model that the computing device 112 generates by temporal IIR filtering, and thresholding, of the depth error mask of FIG. 5A. FIG. 6B is an example second depth error background model that the computing device 112 generates by temporal IIR filtering, and thresholding, of the depth error mask of FIG. 5B. In FIGS. 6A and 6B, the depth errors are inherently related to appearance of the scene within the stereoscopic image of FIG. 4A, because the depth errors are caused by: (a) flat (low texture) regions within such image; and/or (b) objects having specular reflections within such image.

Accordingly, while generating and storing the depth map of FIG. 4B, the computing device 112 also generates and stores: (a) the valid depth mask of FIG. 4C; (b) the depth error masks of FIGS. 5A and 5B, so that the computing device 112 records types (e.g., causes) of the various depth errors (if any) on a pixel-by-pixel basis; and (c) the depth error background models of FIGS. 6A and 6B. The computing device 112 indexes each pixel by such pixel's respective (x, y) coordinate location within the stereoscopic image, the depth map, the valid depth mask, the depth error masks, and the depth error background models.

In the illustrative embodiments, the camera 104 is stationary. Accordingly, the depth error masks of FIGS. 5A and 5B include background information, but such information is relatively noisy. However, such noise is reduced by the depth error background models of FIGS. 6A and 6B, which are comparatively robust.

Figure 7A:
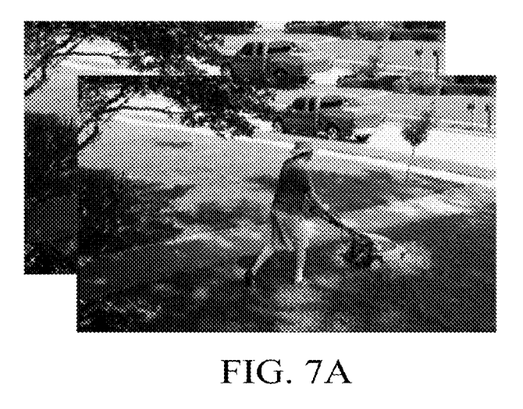
FIG. 7A is an example second stereoscopic image received from the camera of FIG. 1.
Figure 7B:
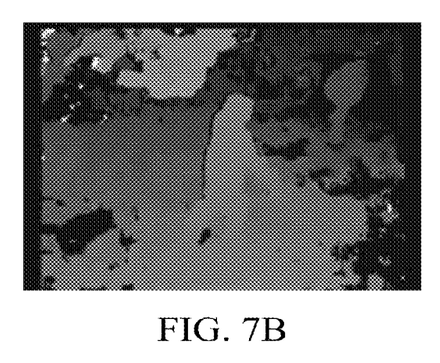
FIG. 7B is an example depth map for the stereoscopic image of FIG. 7A.

FIG. 7A is an example second pair of images received from the camera 104. The associated images of FIG. 7A are a matched pair, which correspond to one another, and which together form a stereoscopic image. FIG. 7B is an example depth map, which is generated by the computing device 112 in response to the stereoscopic image of FIG. 7A.

Figure 7C:
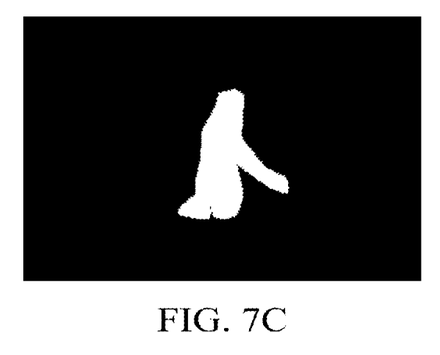
FIG. 7C is a segmentation mask that the computing device of FIG. 1 generates by comparing the depth map of FIG. 7B against the depth map of FIG. 4B, in order to segment a scene's foreground and background.

FIG. 7C is a segmentation mask that the computing device 112 generates by comparing the depth map of FIG. 7B against the depth map of FIG. 4B, in order to segment the scene's foreground and background. In the illustrative embodiments, the computing device 112 performs such comparison by subtracting the depth map of FIG. 4B from the depth map of FIG. 7B. In FIG. 7C, white pixels indicate foreground object(s), and black pixels indicate background.

Accordingly, the white pixels of FIG. 7C indicate (x, y) coordinates where the depth map of FIG. 7B deviates from the depth map of FIG. 4B. In that manner, the depth map of FIG. 4B operates as a model that contains only background (e.g., without foreground objects) of the scene, so that the computing device 112 performs such comparison to detect changes in the scene. In this example, such changes are attributable to appearance of a person and a lawnmower (alongside the nearest sidewalk) as foreground objects in the scene.

Figure 8A:
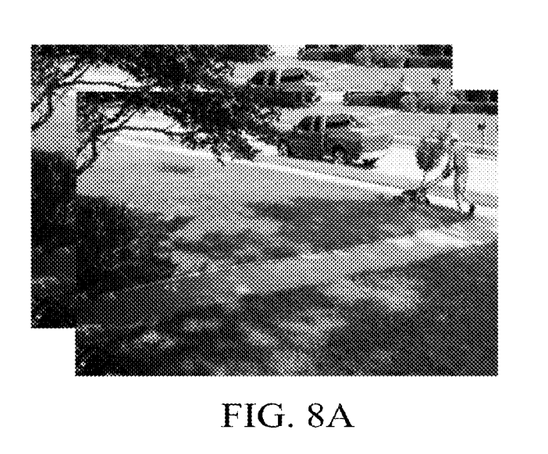
FIG. 8A is an example third stereoscopic image received from the camera of FIG. 1.

FIG. 8A is an example third pair of images received from the camera 104. The associated images of FIG. 8A are a matched pair, which correspond to one another, and which together form a stereoscopic image. In response to the stereoscopic image of FIG. 8A, the computing device 112 generates a depth map (not shown), which includes at least some indeterminate pixels.

Figure 8B:
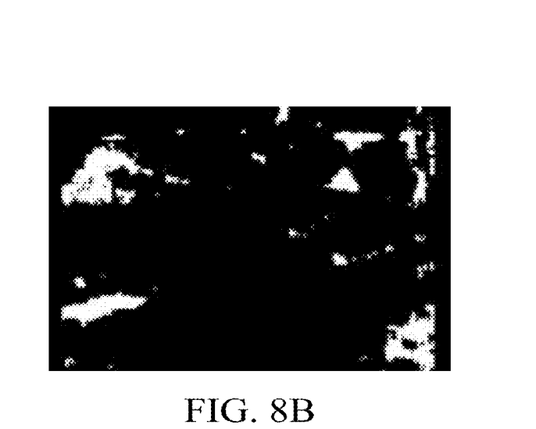
FIG. 8B is an example depth error mask of a portion of indeterminate pixels of a depth map for the stereoscopic image of FIG. 8A.

FIG. 8B is an example depth error mask of a portion of those indeterminate pixels. In the depth error mask of FIG. 8B, white pixels indicate such portion. For those white pixels of such portion, the depth errors are caused by an insufficient curvature within the stereoscopic image of FIG. 8A.

Figure 8C:
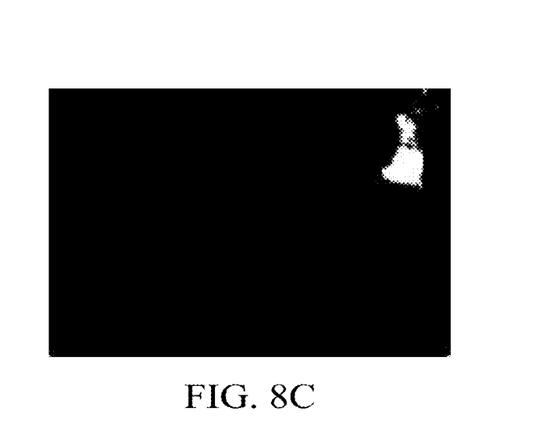
FIG. 8C is a segmentation mask that the computing device of FIG. 1 generates by comparing the depth error mask of FIG. 8B against the depth error background model of FIG. 6A, in order to segment a scene's foreground and background.

FIG. 8C is a segmentation mask that the computing device 112 generates by comparing the depth error mask of FIG. 8B against the depth error background model of FIG. 6A, in order to segment the scene's foreground and background. In the illustrative embodiments, the computing device 112 performs such comparison by subtracting the depth error background model of FIG. 6A from the depth error mask of FIG. 8B. In FIG. 8C, white pixels indicate foreground object(s), and black pixels indicate background.

Accordingly, the white pixels of FIG. 8C indicate (x, y) coordinates where the depth error mask of FIG. 8B deviates from the depth error background model of FIG. 6A. In that manner, the depth error background model of FIG. 6A operates as a model that contains only background of the scene, so that the computing device 112 performs such comparison to detect changes in the scene. In this example, such changes are attributable to appearance of the person and the lawnmower (near a small tree) as foreground objects in the scene.

Figure 9A:
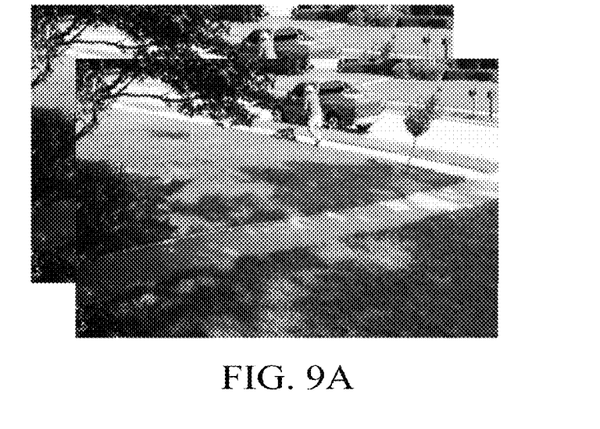
FIG. 9A is an example fourth stereoscopic image received from the camera of FIG. 1.

FIG. 9A is an example fourth pair of images received from the camera 104. The associated images of FIG. 9A are a matched pair, which correspond to one another, and which together form a stereoscopic image. In response to the stereoscopic image of FIG. 9A, the computing device 112 generates a depth map (not shown), which includes at least some indeterminate pixels.

Figure 9B:
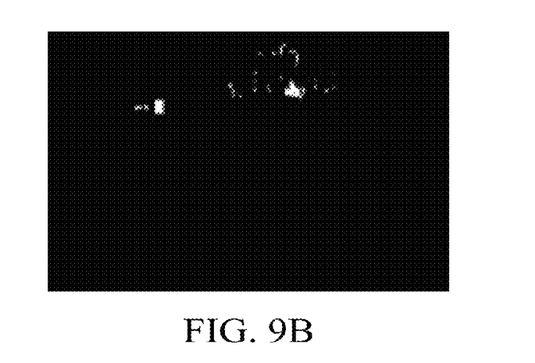
FIG. 9B is an example depth error mask of a portion of indeterminate pixels of a depth map for the stereoscopic image of FIG. 9A.

FIG. 9B is an example depth error mask of a portion of those indeterminate pixels. In the depth error mask of FIG. 9B, white pixels indicate such portion. For those white pixels of such portion, the depth errors are caused by exceeding a search range boundary within the stereoscopic image of FIG. 9A.

Figure 9C:
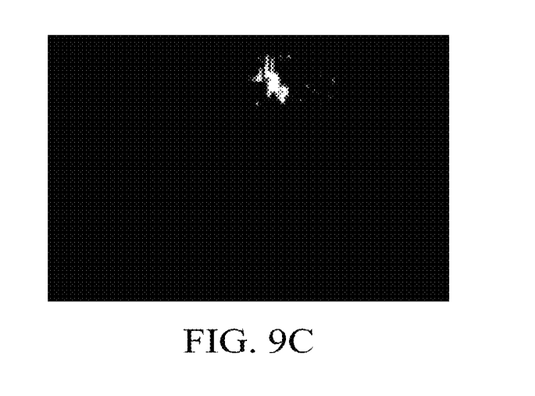
FIG. 9C is a segmentation mask that the computing device of FIG. 1 generates by comparing the depth error mask of FIG. 9B against the depth error background model of FIG. 6B, in order to segment a scene's foreground and background.

FIG. 9C is a segmentation mask that the computing device 112 generates by comparing the depth error mask of FIG. 9B against the depth error background model of FIG. 6B, in order to segment the scene's foreground and background. In the illustrative embodiments, the computing device 112 performs such comparison by subtracting the depth error background model of FIG. 6B from the depth error mask of FIG. 9B. In FIG. 9C, white pixels indicate foreground object(s), and black pixels indicate background.

Accordingly, the white pixels of FIG. 9C indicate (x, y) coordinates where the depth error mask of FIG. 9B deviates from the depth error background model of FIG. 6B. In that manner, the depth error background model of FIG. 6B operates as a model that contains only background of the scene, so that the computing device 112 performs such comparison to detect changes in the scene. In this example, such changes are attributable to appearance of the person and the lawnmower (near windows of a truck) as foreground objects in the scene.

In the examples of FIGS. 8C and 9C, the foreground objects (e.g., the person and the lawnmower) appear in regions of the scene where: (a) indeterminate pixels exist in the depth map of FIG. 4B, such as near the small tree in the example of FIG. 8A; and/or (b) a relatively small difference exists between respective depths of a foreground object and its nearest background, such as near windows of the truck in the example of FIG. 9A. In another example, a foreground object appears in a region of the scene where a resolution of the camera 104 does not fully distinguish the foreground object from its nearest background. Accordingly, in those examples: (a) the foreground objects could remain undetected by a comparison between only depth maps; and (b) nevertheless, the computing device 112 detects the foreground objects by comparing a depth error mask (e.g., FIG. 8B or FIG. 9B) against a depth error background model (e.g., FIG. 6A or FIG. 6B).

Figure 10:
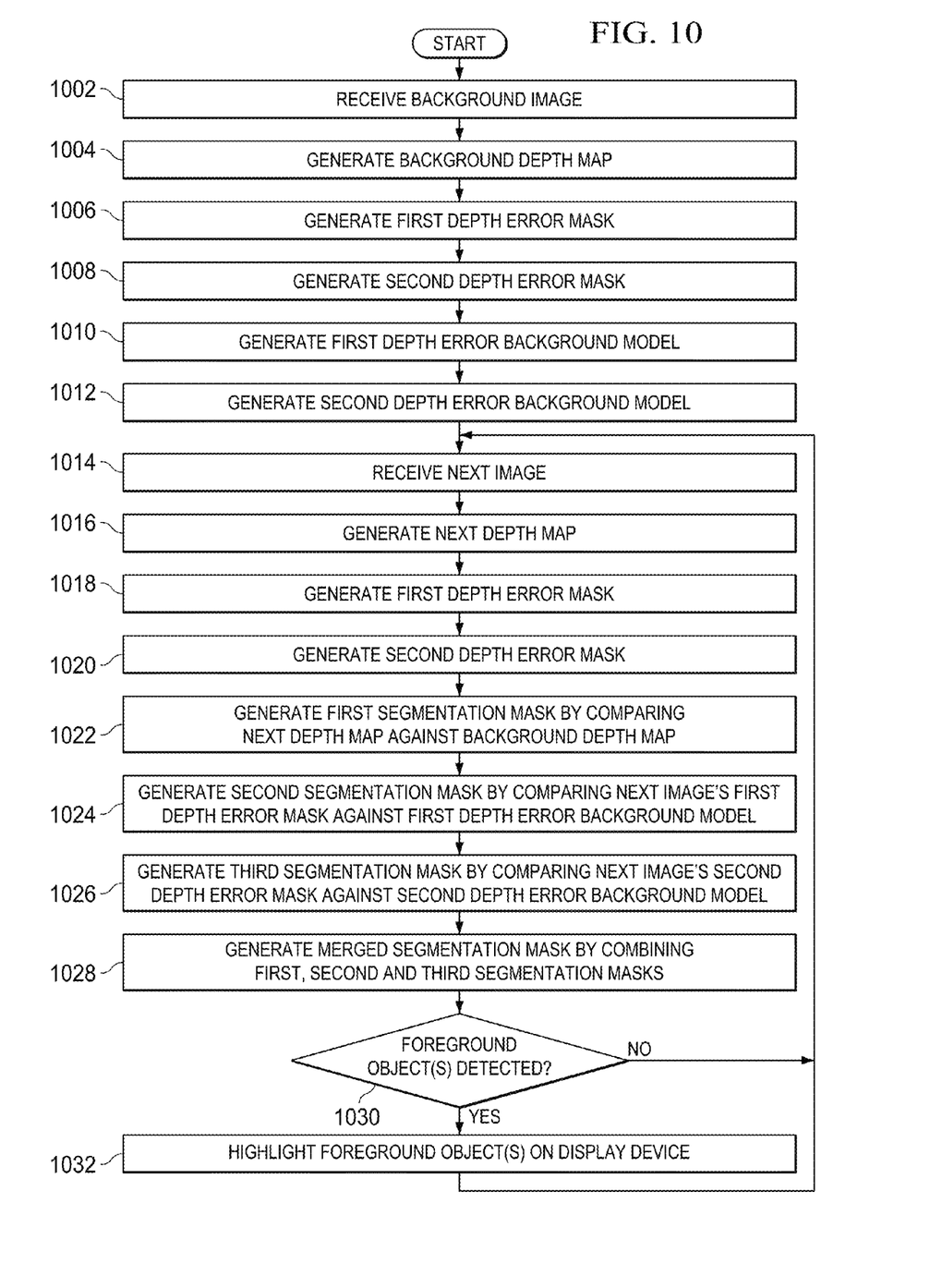
FIG. 10 is a flowchart of an operation of the computing device of FIG. 1.

FIG. 10 is a flowchart of an operation of the computing device 112. The computing device 112: (a) at a step 1002, receives a stereoscopic image of the scene's background ("background image") from the decoding device 110; and (b) at a step 1004, generates a depth map in response to the background image ("background depth map"). In one example, the computing device 112 performs the step 1002 in response to a command that the user 116 specifies via the touchscreen of the display device 114, so that such command indicates when the scene contains only background (e.g., without foreground objects).

In response to the depth map generation of step 1004, the computing device 112: (a) at a step 1006, generates a first depth error mask of depth errors that are caused by an insufficient curvature within the background image (e.g., FIG. 5A); and (b) at a step 1008, generates a second depth error mask of depth errors that are caused by exceeding a search range boundary within the background image (e.g., FIG. 5B). Further, the computing device 112: (a) at a step 1010, generates a first depth error background model (e.g., FIG. 6A) by temporal IIR filtering, and thresholding, of the first depth error mask; and (b) at a step 1012, generates a second depth error background model (e.g., FIG. 6B) by temporal IIR filtering, and thresholding, of the second depth error mask.

After generating the background depth map (from the step 1004), and the first and second depth error background models (from the steps 1010 and 1012), the computing device 112: (a) at a step 1014, receives a next stereoscopic image ("next image") of the scene's video sequence from the decoding device 110; and (b) at a step 1016, generates a depth map in response to the next image ("next depth map"). In response to the depth map generation of step 1016, the computing device 112: (a) at a step 1018, generates a first depth error mask of depth errors that are caused by an insufficient curvature within the next image; and (b) at a step 1020, generates a second depth error mask of depth errors that are caused by exceeding a search range boundary within the next image.

Moreover, the computing device 112: (a) at a step 1022, generates a first segmentation mask by comparing the next depth map (from the step 1016) against the background depth map (from the step 1004), as discussed hereinabove in connection with FIG. 7C; (b) at a step 1024, generates a second segmentation mask by comparing the next image's first depth error mask (from the step 1018) against the first depth error background model (from the step 1010), as discussed hereinabove in connection with FIG. 8C; and (c) at a step 1026, generates a third segmentation mask by comparing the next image's second depth error mask (from the step 1020) against the second depth error background model (from the step 1012), as discussed hereinabove in connection with FIG. 9C.

At a step 1028, the computing device 112 generates a merged segmentation mask by combining the first segmentation mask (from the step 1022), the second segmentation mask (from the step 1024), and the third segmentation mask (from the step 1026). In one embodiment, the computing device 112 performs such combining by a logical OR operation, which has an effect of overlaying the first, second and third segmentation masks in alignment with one another. By performing such combining at the step 1028, the computing device 112 is able to more efficiently (and more completely) determine whether the next image includes foreground object(s).

At a step 1030, in response to the merged segmentation mask (from the step 1028), the computing device 112 determines whether the next image includes foreground object(s). In response to the computing device 112 detecting that the next image includes no foreground object, the operation returns from the step 1030 to the step 1014 for processing of yet another stereoscopic image of the scene's video sequence from the decoding device 110. Conversely, in response to the computing device 112 detecting that the next image includes at least one foreground object, the operation continues from the step 1030 to a step 1032.

At the step 1032, the computing device 112: (a) modifies the video sequence to highlight respective location(s) of the detected foreground object(s), so that such highlighting is displayed to the user 116 by the display device 114; and (b) writes the modified video sequence for storage into the storage device 108. After the step 1032, the operation returns to the step 1014 for processing of yet another stereoscopic image of the scene's video sequence from the decoding device 110. Accordingly, the system 100 is useful in various environments (e.g., video security systems) for motion detection, tracking and classification. In one embodiment, on a substantially continuous basis: (a) the camera 104 views the scene; and (b) in response to such viewing by the camera 104, the computing device 112 performs the operation of FIG. 10 to detect changes in the scene (e.g., appearance or disappearance therein of objects between successive images of the scene) and to periodically update the background depth map and the first and second depth error background models by reperforming the steps 1002 through 1012 (e.g., automatically, or in response to a command that the user 116 specifies via the touchscreen of the display device 114).

In the illustrative embodiments, a computer program product is an article of manufacture that has: (a) a computer-readable medium; and (b) a computer-readable program that is stored on such medium. Such program is processable by an instruction execution apparatus (e.g., system or device) for causing the apparatus to perform various operations discussed hereinabove (e.g., discussed in connection with a block diagram). For example, in response to processing (e.g., executing) such program's instructions, the apparatus (e.g., programmable information handling system) performs various operations discussed hereinabove. Accordingly, such operations are computer-implemented.

Such program (e.g., software, firmware, and/or microcode) is written in one or more programming languages, such as: an object-oriented programming language (e.g., C++); a procedural programming language (e.g., C); and/or any suitable combination thereof. In a first example, the computer-readable medium is a computer-readable storage medium. In a second example, the computer-readable medium is a computer-readable signal medium.

A computer-readable storage medium includes any system, device and/or other non-transitory tangible apparatus (e.g., electronic, magnetic, optical, electromagnetic, infrared, semiconductor, and/or any suitable combination thereof) that is suitable for storing a program, so that such program is processable by an instruction execution apparatus for causing the apparatus to perform various operations discussed hereinabove. Examples of a computer-readable storage medium include, but are not limited to: an electrical connection having one or more wires; a portable computer diskette; a hard disk; a random access memory ("RAM"); a read-only memory ("ROM"); an erasable programmable read-only memory ("EPROM" or flash memory); an optical fiber; a portable compact disc read-only memory ("CD-ROM"); an optical storage device; a magnetic storage device; and/or any suitable combination thereof.

A computer-readable signal medium includes any computer-readable medium (other than a computer-readable storage medium) that is suitable for communicating (e.g., propagating or transmitting) a program, so that such program is processable by an instruction execution apparatus for causing the apparatus to perform various operations discussed hereinabove. In one example, a computer-readable signal medium includes a data signal having computer-readable program code embodied therein (e.g., in baseband or as part of a carrier wave), which is communicated (e.g., electronically, electromagnetically, and/or optically) via wireline, wireless, optical fiber cable, and/or any suitable combination thereof.

Although illustrative embodiments have been shown and described by way of example, a wide range of alternative embodiments is possible within the scope of the foregoing disclosure.

What is claimed is:

1. A method performed by at least one device for segmenting an image, the method comprising:

generating a first depth map in response to a first stereoscopic image from a camera, wherein the first depth map includes first pixels having valid depths and second pixels having invalid depths;

generating a second depth map in response to a second stereoscopic image from the camera, wherein the second depth map includes third pixels having valid depths and fourth pixels having invalid depths, wherein the second and fourth pixels have a first type of invalid depths, wherein the first depth map includes fifth pixels having a second type of invalid depths, and wherein the second depth map includes sixth pixels having the second type of invalid depths;

generating a first segmentation mask in response to the first pixels and the third pixels;

generating a second segmentation mask in response to the second pixels and the fourth pixels;

generating a third segmentation mask in response to at least the sixth pixels; and in response to the first, second and third segmentation masks, determining whether the second stereoscopic image includes a change in comparison to the first stereoscopic image.

2. The method of claim 1, wherein generating the third segmentation mask includes generating the third segmentation mask in response to the fifth pixels and the sixth pixels.

3. The method of claim 2, wherein the first type of invalid depths are caused by an insufficient curvature within the first and second stereoscopic images, and wherein the second type of invalid depths are caused by exceeding a search range boundary within the first and second stereoscopic images.

4. The method of claim 1, and comprising:

generating a background model in response to an error mask of the second pixels, wherein generating the second segmentation mask includes: generating the second segmentation mask in response to the background model and the fourth pixels.

5. The method of claim 4, wherein generating the background model includes temporal IIR filtering, and thresholding, of the error mask of the second pixels.

6. The method of claim 4, wherein the background model is a first background model, and comprising:

generating a second background model in response to an error mask of the fifth pixels; and wherein generating the third segmentation mask includes: generating the third segmentation mask in response to the second background model and the sixth pixels.

7. The method of claim 6, wherein: generating the first background model includes temporal IIR filtering, and thresholding, of the error mask of the second pixels; and generating the second background model includes temporal IIR filtering, and thresholding, of the error mask of the fifth pixels.

8. The method of claim 6, wherein generating the second segmentation mask includes comparing an error mask of the fourth pixels against the first background model, and wherein generating the third segmentation mask includes comparing an error mask of the sixth pixels against the second background model.

9. The method of claim 1, wherein generating the first segmentation mask includes comparing the second depth map against the first depth map.

10. The method of claim 1, wherein the first stereoscopic image is a view of a scene at a first time, and wherein the second stereoscopic image is a view of the scene at a second time.

11. A system for segmenting an image, the system comprising:
a combination of electronic circuitry components for: generating a first depth map in response to a first stereoscopic image from a camera, wherein the first depth map includes first pixels having valid depths and second pixels having invalid depths; generating a second depth map in response to a second stereoscopic image from the camera, wherein the second depth map includes third pixels having valid depths and fourth pixels having invalid depths, wherein the second and fourth pixels have a first type of invalid depths, wherein the first depth map includes fifth pixels having a second type of invalid depths, and wherein the second depth map includes sixth pixels having the second type of invalid depths; generating a first segmentation mask in response to the first pixels and the third pixels; generating a second segmentation mask in response to the second pixels and the fourth pixels; generating a third segmentation mask in response to at least the sixth pixels; and, in response to the first, second and third segmentation masks, determining whether the second stereoscopic image includes a change in comparison to the first stereoscopic image.

12. The system of claim 11, wherein generating the third segmentation mask includes generating the third segmentation mask in response to the fifth pixels and the sixth pixels.

13. The system of claim 12, wherein the first type of invalid depths are caused by an insufficient curvature within the first and second stereoscopic images, and wherein the second type of invalid depths are caused by exceeding a search range boundary within the first and second stereoscopic images.

14. The system of claim 11, wherein the combination of electronic circuitry components for generating a background model in response to an error mask of the second pixels, and wherein generating the second segmentation mask includes: generating the second segmentation mask in response to the background model and the fourth pixels.

15. The system of claim 14, wherein generating the background model includes temporal IIR filtering, and thresholding, of the error mask of the second pixels.

16. The system of claim 14, wherein the background model is a first background model, wherein the combination of electronic circuitry components is for generating a second background model in response to an error mask of the fifth pixels, and wherein generating the third segmentation mask includes: generating the third segmentation mask in response to the second background model and the sixth pixels.

17. The system of claim 16, wherein: generating the first background model includes temporal IIR filtering, and thresholding, of the error mask of the second pixels; and generating the second background model includes temporal IIR filtering, and thresholding, of the error mask of the fifth pixels.

18. The system of claim 16, wherein generating the second segmentation mask includes comparing an error mask of the fourth pixels against the first background model, and wherein generating the third segmentation mask includes comparing an error mask of the sixth pixels against the second background model.

19. The system of claim 11, wherein generating the first segmentation mask includes comparing the second depth map against the first depth map.

20. The system of claim 11, wherein the first stereoscopic image is a view of a scene at a first time, and wherein the second stereoscopic image is a view of the scene at a second time.

21. A computer program product for segmenting an image, the computer program product comprising:
a non-transitory computer-readable medium; and
a computer-readable program stored on the non-transitory computer-readable medium, wherein the computer-readable program is processable by an information handling system for causing the information handling system to perform operations including: generating a first depth map in response to a first stereoscopic image from a camera, wherein the first depth map includes first pixels having valid depths and second pixels having invalid depths; generating a second depth map in response to a second stereoscopic image from the camera, wherein the second depth map includes third pixels having valid depths and fourth pixels having invalid depths, wherein the second and fourth pixels have a first type of invalid depths, wherein the first depth map includes fifth pixels having a second type of invalid depths and wherein the second depth may includes sixth pixels having the second type of invalid depths; generating a first segmentation mask in response to the first pixels and the third pixels; generating a second segmentation mask in response to the second pixels and the fourth pixels; generating a third segmentation mask in response to at least the sixth pixels; and, in response to the first, second and third segmentation masks, determining whether the second stereoscopic image includes a change in comparison to the first stereoscopic image.

22. The computer program product of claim 21, wherein generating the third segmentation mask includes generating the third segmentation mask in response to the fifth pixels and the sixth pixels.

23. The computer program product of claim 22, wherein the first type of invalid depths are caused by an insufficient curvature within the first and second stereoscopic images, and wherein the second type of invalid depths are caused by exceeding a search range boundary within the first and second stereoscopic images.

24. The computer program product of claim 21, wherein the operations include generating a background model in response to an error mask of the second pixels, and wherein generating the second segmentation mask includes: generating the second segmentation mask in response to the background model and the fourth pixels.

25. The computer program product of claim 24, wherein generating the background model includes temporal IIR filtering, and thresholding, of the error mask of the second pixels.

26. The computer program product of claim 24, wherein the background model is a first background model, wherein the operations include generating a second background model in response to an error mask of the fifth pixels, and wherein generating the third segmentation mask includes: generating the third segmentation mask in response to the second background model and the sixth pixels.

27. The computer program product of claim 26, wherein: generating the first background model includes temporal IIR filtering, and thresholding, of the error mask of the second pixels; and generating the second background model includes temporal IIR filtering, and thresholding, of the error mask of the fifth pixels.

28. The computer program product of claim 26, wherein generating the second segmentation mask includes comparing an error mask of the fourth pixels against the first background model, and wherein generating the third segmentation mask includes comparing an error mask of the sixth pixels against the second background model.

29. The computer program product of claim 21, wherein generating the first segmentation mask includes comparing the second depth map against the first depth map.

30. The computer program product of claim 21, wherein the first stereoscopic image is a view of a scene at a first time, and wherein the second stereoscopic image is a view of the scene at a second time.

* * * * *